(12) United States Patent
Grey

(10) Patent No.: US 7,438,736 B1
(45) Date of Patent: Oct. 21, 2008

(54) FILTER BAG STRUCTURE

(75) Inventor: Jerry Alan Grey, Shawnee, KS (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 11/820,937

(22) Filed: Jun. 21, 2007

(51) Int. Cl.
*B01D 29/25* (2006.01)
*B01D 29/27* (2006.01)

(52) U.S. Cl. .................. 55/341.2; 55/360; 55/374; 55/378; 55/381

(58) Field of Classification Search ........... 55/341.1, 55/341.2, 360, 374, 376–379, 381, 382, 498; 210/243
See application file for complete search history.

(56) References Cited

U.S. PATENT DOCUMENTS

| | | | | |
|---|---|---|---|---|
| 1,574,422 A * | 2/1926 | Feind | ........... | 55/360 |
| 2,308,310 A * | 1/1943 | Ruemelin, Jr. et al. | . | 285/148.13 |
| 2,684,126 A * | 7/1954 | Doyle, Sr. | ........... | 55/360 |
| 3,937,621 A * | 2/1976 | Gravley | ........... | 55/377 |
| 4,015,961 A * | 4/1977 | Howard et al. | ........... | 55/378 |
| 4,220,459 A * | 9/1980 | Hammond et al. | ......... | 55/341.1 |
| 4,251,244 A * | 2/1981 | Evenstad | ........... | 55/302 |
| 4,336,035 A * | 6/1982 | Evenstad et al. | ........... | 95/286 |
| 4,512,789 A * | 4/1985 | Pettit et al. | ........... | 55/378 |
| 4,531,957 A * | 7/1985 | Malik | ........... | 55/360 |
| 5,213,882 A | 5/1993 | Sassa et al. | | |
| 5,229,200 A * | 7/1993 | Sassa et al. | ........... | 442/57 |
| 5,527,569 A | 6/1996 | Hobson et al. | | |
| 5,746,792 A * | 5/1998 | Clements et al. | ........... | 55/341.1 |
| 6,099,726 A | 8/2000 | Gembolis et al. | | |
| 7,279,021 B2 * | 10/2007 | Haberlein | ........... | 55/360 |
| 2005/0229556 A1 * | 10/2005 | Haberlein | ........... | 55/360 |
| 2005/0247105 A1 | 11/2005 | Dikken at el. | | |
| 2007/0266681 A1 * | 11/2007 | Grey et al. | ........... | 55/378 |

FOREIGN PATENT DOCUMENTS

EP        529225 A1 *  3/1993  .................. 55/378

* cited by examiner

*Primary Examiner*—Richard L Chiesa
(74) *Attorney, Agent, or Firm*—Greg Strugalski Strugalski; Ernest G. Cusick; Frank A. Landgraff

(57) ABSTRACT

A filter bag structure for use in a baghouse that has a tubesheet with a plurality of openings. The filter bag structure includes a substantially cylindrical filter bag having an axial end portion formed into a cuff. The filter bag has filtration media of a substantially electrically non-conductive material. The cuff of the filter bag is to be positioned adjacent an opening and mounted to structure of the tubesheet. An electrically conductive ground wire extends along a portion of the filter bag and has a portion to contact the tubesheet. An electrically conductive anti-collapse ring extends around another portion of the filter bag. An electrically conductive cover secures the anti-collapse ring to the filter bag and provides electrical conductivity between the ground wire and anti-collapse ring.

11 Claims, 4 Drawing Sheets

FILTER BAG STRUCTURE

BACKGROUND OF THE INVENTION

1. Field of the Invention

The invention is generally directed to a filter bag for use in a dust collector. In particular, the invention is directed to a static dissipative filter bag with electrically conductive structure incorporated into the filter bag.

2. Description of the Prior Art

Dust collectors, such as baghouses, for filtering particulate-laden gas streams are known. A typical "reverse air" baghouse has a housing with an inlet chamber and an outlet chamber. The two chambers are separated by sheet metal, commonly referred to as a tubesheet. The tubesheet is typically located in the lower area of this type of baghouse. The tubesheet has a number of openings around which mounting thimbles are welded.

Filter bags are supported in the baghouse. The filter bags are attached at their lower end portions to respective mounting thimbles. The filter bags extend upwardly in the outlet chamber and are attached at an upper end portion to support structure. The filter bags are generally connected to attachments or tensioning devices at their upper end portions.

Particulate-laden gas is directed into the inlet chamber. The gas flows through the opening in the tubesheet, thimbles and filters into the outlet chamber. Particulates are separated from the gas stream at internal surfaces of the filter bags. The filtered gas is exhausted from the outlet chamber or directed for other uses. The filter bags are often made from a substantially non-conductive woven fiberglass filtration media material, or any other suitable filtration media such as knit or felt synthetic material.

The filter bags are periodically cleaned by reversing the flow of gas in the baghouse. In order to prevent the filer bag from collapsing inwardly on itself and restrict or pinch off cleaning gas flow, anti-collapse rings made from metal are attached to the filter bags. Ring covers attach the anti-collapse rings to the filter bags and are typically formed from woven fiberglass fabric that is folded and then sewn to form a pocket which contains the anti-collapse ring.

Often the inlet gas may contain flammable or ignitable material. This material may be ignited by sparks or discharge of built up static electricity. In some applications, static electrical charges tend to build up on isolated metal components of a filter bag. The static charges can cause process dust to accumulate unevenly on the filter media, tending to agglomerate near the location of the anti-collapse rings. A static charge allowed to build up creates a potential of a spark discharge to other nearby metal components. In some process dust applications, such a discharge could ignite the process dust or ignitable material to cause a fire or explosion in the baghouse.

One known solution to this problem is to provide a filtration media that is electrically conductive. This solution has disadvantages of being relatively costly and adversely affecting the filtration efficiency of the filtration media. Thus, a need exists for a way to provide an electrically conductive path from metal components of the filter bag, such as the anti-collapse rings, to ground with out the disadvantages of the known solutions.

BRIEF DESCRIPTION OF THE INVENTION

One aspect of this invention provides an electrically conductive path from the anti-collapse rings to ground in a relatively inexpensive manner and without appreciably affecting filtration efficiency.

One aspect of the invention is a static dissipative filter bag structure for use in a baghouse having a tubesheet with a plurality of openings. The filter bag structure comprises a filter bag having a portion formed into a cuff. The filter bag has filtration media made of a substantially electrically non-conductive material. The cuff of the filter bag is to be positioned adjacent an opening and mounted to structure of the tubesheet. An electrically conductive ground wire extends along a portion of the filter bag and has a portion to contact the tubesheet for electrical conductivity. An electrically conductive anti-collapse ring extends around another portion of the filter bag. An electrically conductive cover secures the anti-collapse ring to the filter bag and provides electrical conductivity between the ground wire and anti-collapse ring.

Another aspect of the invention is a filter bag structure for use in a baghouse having a tubesheet with a plurality of openings. The filter bag structure comprises a substantially cylindrical filter bag having an axial end portion formed into a cuff. The filter bag has filtration media of a substantially electrically non-conductive material. The cuff of the filter bag is to be positioned adjacent an opening and mounted to structure of the tubesheet. An electrically conductive ground wire extends along a portion of the filter bag and has a portion to contact the tubesheet. An electrically conductive anti-collapse ring extends around another portion of the filter bag. An electrically conductive cover secures the anti-collapse ring to the filter bag and provides electrical conductivity between the ground wire and anti-collapse ring. The cuff includes electrically conductive material contacting the ground wire for electrical conductivity and for contacting the tubesheet structure for electrical conductivity.

BRIEF DESCRIPTION OF THE DRAWINGS

Further features of the invention will become apparent from reading the following description with reference to the accompanying drawings, in which.

DETAILED DESCRIPTION OF THE INVENTION

Figure 1:
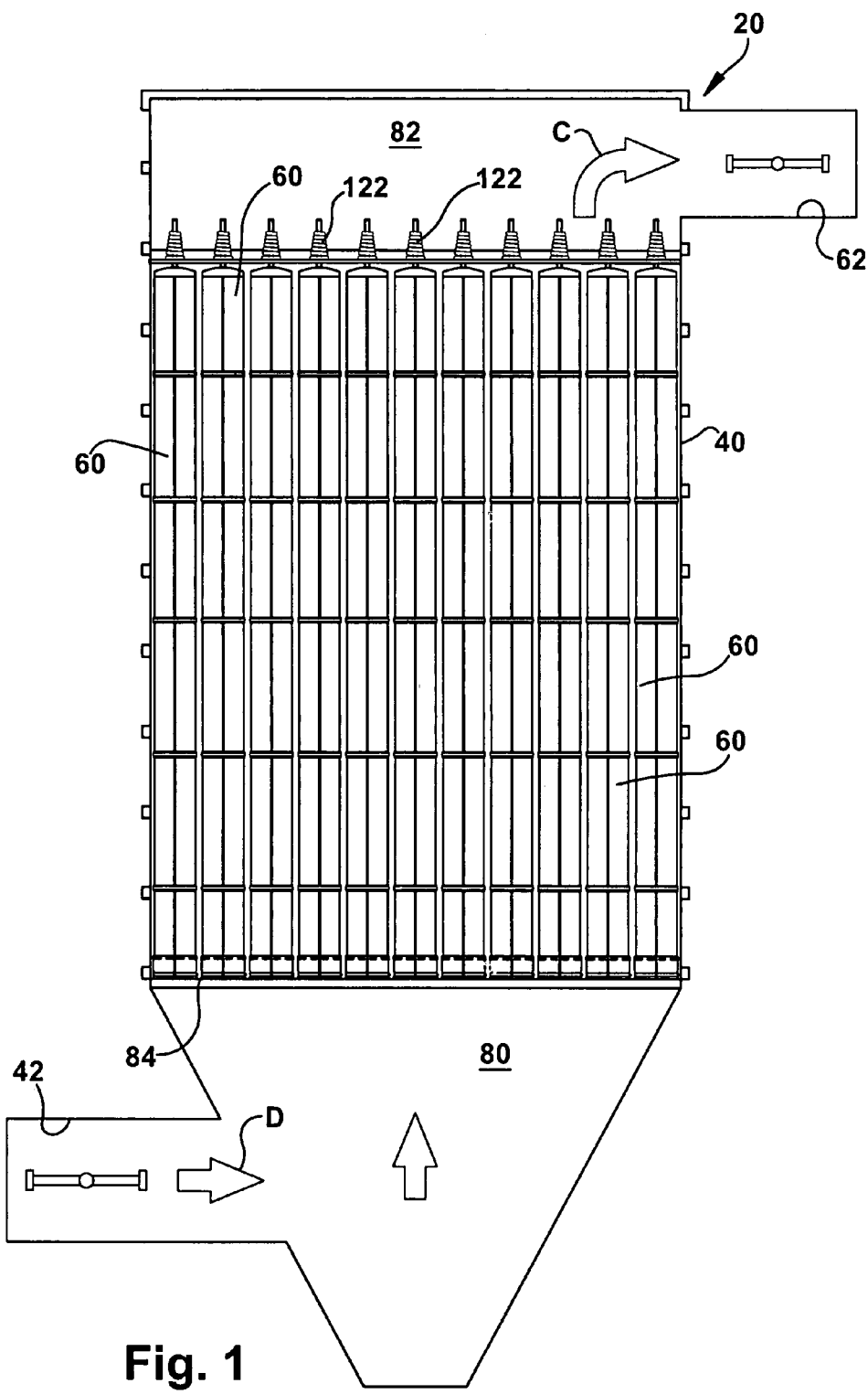
FIG. 1 is a schematic view, partly in section, of a baghouse with a filter bag constructed according to one aspect of the invention.

A "reverse air" baghouse 20 is illustrated in FIG. 1. The baghouse 20 includes an enclosed housing 40. The housing 40 is made from a suitable material, such as sheet metal. Dirty or particulate-laden gas D enters the baghouse 20 through an inlet 42. The gas D may also contain process dust and/or flammable or ignitable material. While a reverse air baghouse is illustrated and described, it will be appreciated that the invention may be applied to other types of baghouses, such as a "shaker" type.

The particulate-laden gas D is filtered by a plurality of filter bags 60 installed in the baghouse 20. Each of the filter bags 60 is constructed according to one aspect of the invention. Particulates are removed from the gas stream by the filter bags 60. The particulates are collected on the interior of filtration media of the filter bags 60. Filtered gas C then flows from the filter bags 60 and exits the baghouse 20 through an outlet 62. Cleaning of the filter bags 60 occurs periodically by a known "reverse air" procedure.

Figure 5:
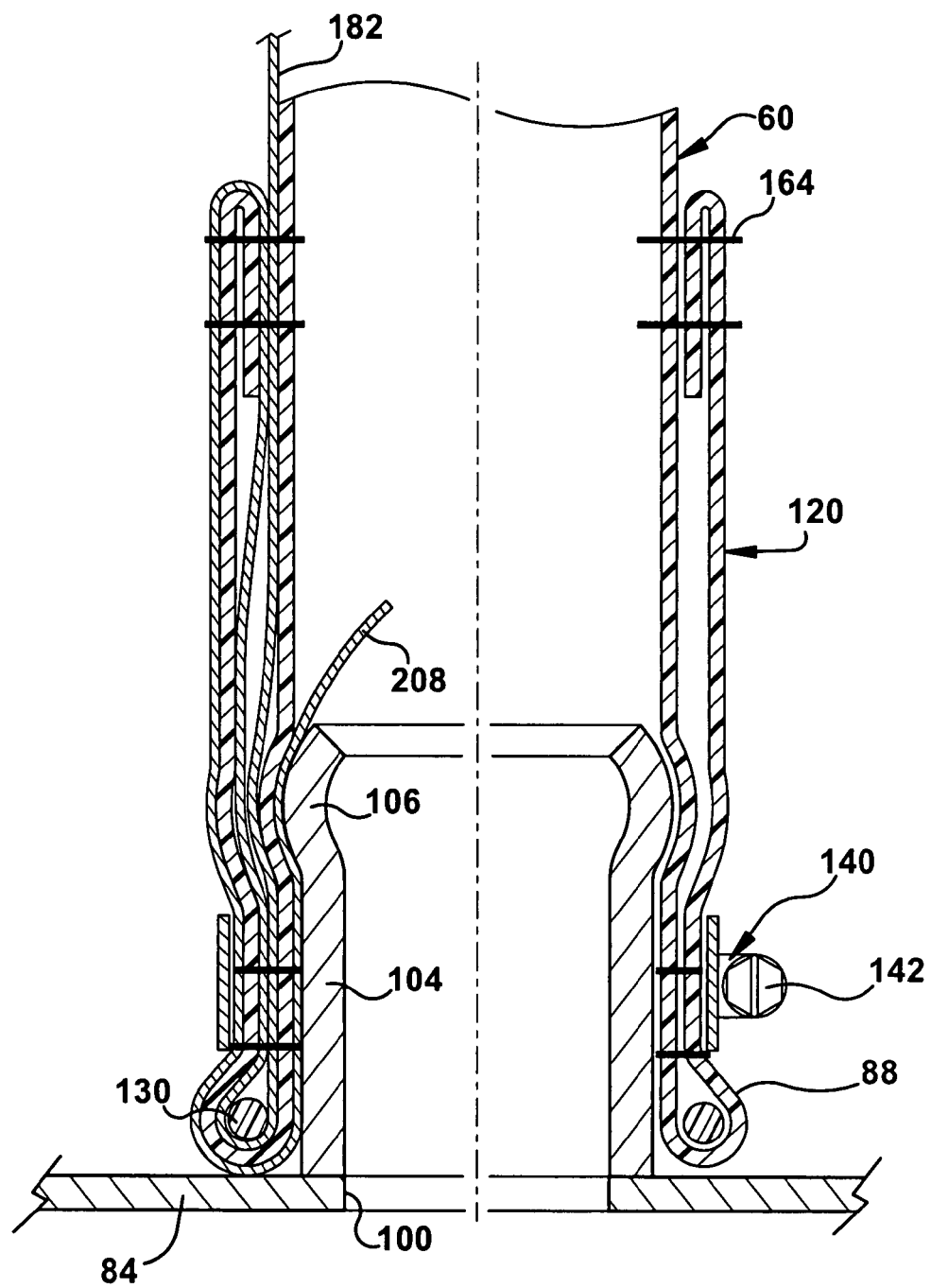
FIG. 5 is an enlarged cross-sectional view of another portion of the filter bag of FIG. 2.

The baghouse 20 is divided into a inlet plenum 80 and an outlet plenum 82 by a tubesheet 84 (best seen in FIG. 5). The tubesheet 84 is made from a suitable material, such as a metal plate or sheet. The inlet 42 is in fluid communication with the inlet plenum 80. The outlet 62 is in fluid communication with the outlet plenum 82. The tubesheet 84 has at least a portion that is substantially planar and that mounts and supports the filter assemblies 60. The filter assemblies 60 are illustrated as extending a distance that approaches the length of the outlet plenum 82.

A plurality of circular openings 100 (FIG. 5) extend through the planar portion of the tubesheet 84. Each opening 100 in the tubesheet 84 has an effective diameter, defined by the inner circumferential surface of the opening. A plurality of beaded thimbles 104 are attached to the tubesheet 84, typically by welds. Each of the thimbles 104 has a substantially cylindrical shape with an inner diameter substantially the same as the opening 100. Each of the thimbles 104 also includes a beaded portion 106. The beaded portion 106 is formed in an axial end portion of the thimble 104 opposite the end attached to the tubesheet 84.

The illustrated filter bags 60 according to one aspect of the invention are in the form of a "reverse air bag". Each filter bag 60 is supported at its lower end, as viewed in FIG. 5, by the tubesheet 84 at a beaded thimble 104, and extends upwardly in a substantially vertical direction. It will be apparent that the filter bags 60 may be oriented in any direction.

Each filter bag 60 is formed into a substantially cylindrical shape. The filter bag 60 has a first axial end portion that is open and mounted to the beaded thimble 104. The filter bag 60 also has a second axially opposite end portion that is closed and attached to support structure of the housing 40 through a tensioning device 122.

The filter bag 60 may be made out of any suitable filtration media material for its intended application. Suitable filtration media materials for filtering particulate laden gases are electrically non-conductive materials, such as, is woven fiber glass or aramid fibers. The open end of the filter bag 60 is formed into a cuff 120 by turning an end of the filer bag material back onto itself. The turned back end of the filter bag 60 is attached by stitches 164 extending around the circumference of the filter bag.

Figures 2, 3:
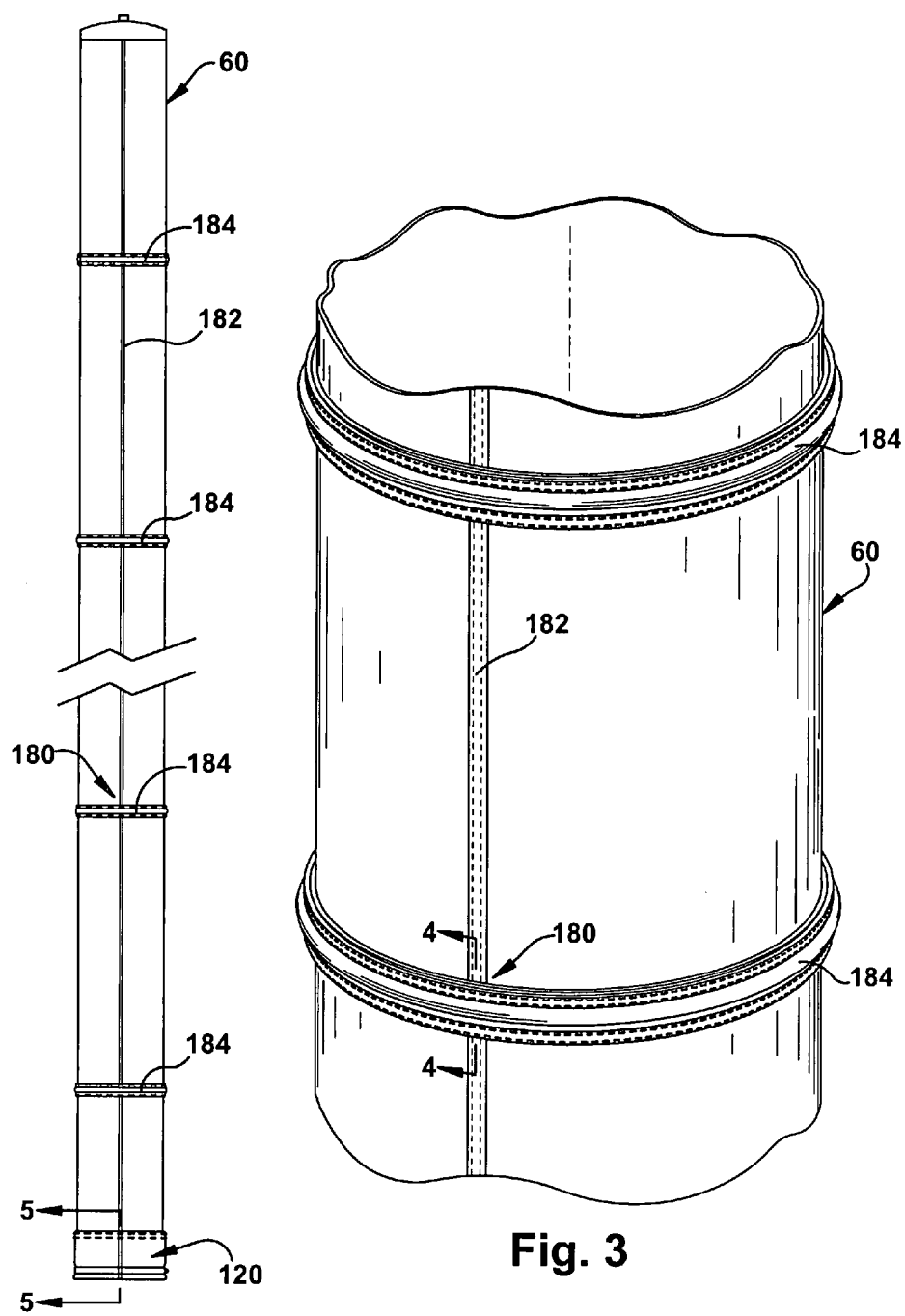
FIG. 2 is an enlarged elevational view of a filter bag of FIG. 1.
FIG. 3 is an enlarged perspective view of a portion of the filter bag illustrated in FIG. 2, illustrating one aspect of the invention.

Each of the filter bags 60 is attached at a first axial end portion 120 (FIGS. 2 and 5) to a respective thimble 104. Each of the filter bags 60 is also attached at a second axial end portion to a tensioning device 122 (FIG. 1) mounted to the housing 40 of the baghouse 20. The tensioning devices 122 apply a force to keep the filter bags 60 taut and substantially cylindrical.

Referring to FIG. 5, the filter bag 60 has a lower end portion or cuff 120 installed over the outer periphery of the thimble 104. The cuff 120 of the filter bag 60 includes a cord 130. The lowermost end of the cuff 120 containing the cord 130 of the filter bag 60 is located axially away from the beaded portion 106 of the thimble 104 when the filter bag is properly installed.

The cuff 120 is made of the filtration media folded over itself at the bottom of the filter bag 60. The cord 130 is located at the very axial end of the inside of the cuff 120. An upper portion of the cuff 120 is sewn to the filter bag 60 by stitches 162.

A stainless steel clamp 140 extends completely around the cuff 120 of the filter bag 60. The clamp 140 is located axially between the cord 130 and the beaded portion 106 of the thimble 104. An adjusting portion 142 of the clamp 140 is tightened to circumferentially contract the clamp into engagement around the cuff 120 of the filter bag 60. The clamp 140 is tightened a sufficient amount to force the cuff 120 of the filter bag 60 into sealing engagement against the outer surface of the beaded thimble 104.

Figure 4:
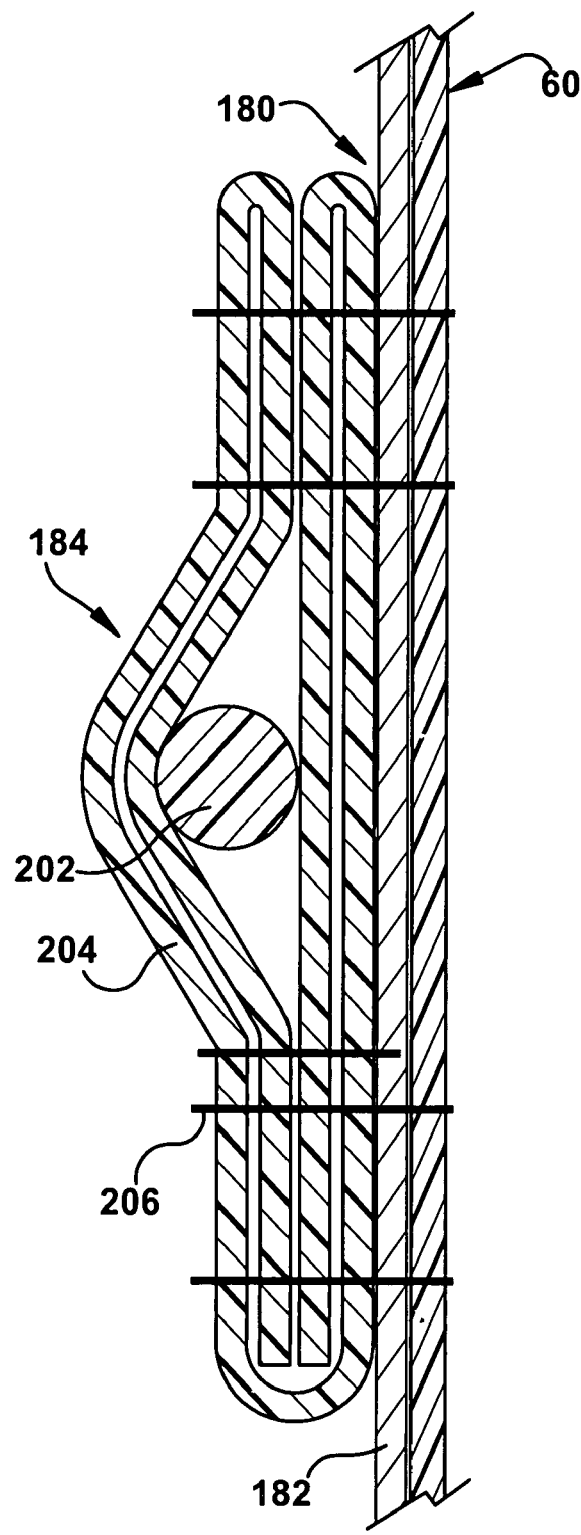
FIG. 4 is an enlarged cross-sectional view of a portion of the filter bag of FIG. 3.

Each filter bag 60 also includes grounding structure 180 (FIGS. 2-5), according to one aspect of the invention, located along the majority of the exterior of the filter bag 60. The grounding structure 180 includes a ground wire 182 and several "anti-collapse" devices 184. Each anti-collapse device 184 includes a metal anti-collapse ring 202 (FIG. 4). The anti-collapse devices 184 prevent the filter bag 60 from collapsing inwardly on itself and restrict or pinch off cleaning gas flow.

Static electrical charges tend to build up on isolated metal components of the filter bag 60, such as the anti-collapse ring 202. The static charges can cause a portion of the particulates removed from the gas D to accumulate on the filtration media and thereby lower cleaning efficiency of the filter bag 60 during operation in areas adjacent the anti-collapse rings 202. Furthermore, if the gas D also contains flammable or ignitable material and the static electricity built up discharges, problems in the baghouse could result.

The grounding structure 180 is provided on the filter bag 60 to reduce the static charge associated with the metal anti-collapse rings 202. This is accomplished by providing electrical conductivity between the anti-collapse rings 202 and the metal thimbles 104 and the ultimately grounded tubesheet 100. The electrical conductivity path to ground is established by the ground wire 182 physically contacting an anti-collapse device 184 and a thimble 104.

The ground wire 182 is made from a flexible steel mesh material that does not appreciably restrict gas flow. The ground wire 182 is sewn to the seam of the filter bag 60 and extends for substantially the length of the filter bag. The ground wire 182 has an extra length in the form of an end portion 208 at the lower end of the filtration bag, as viewed in FIG. 5.

Each anti-collapse ring 202 is attached to the filter bag 60 by a cover 204 (FIG. 4). The cover 204 is made from a flexible steel mesh material that does not appreciably restrict gas flow. The cover 204 is made of a double layer of the steel mesh folded over. The cover 204 is sewn to the filter bag 60 by stitches 206. This physical contact with electrically conductive components creates an electrically conductive path along the filter bag 60 to ground. The electrically conductive path is sufficient to prevent static buildup.

The ground wire 182 has its end 208 extend in the cuff 120 and around the cord 130. The end 208 extends upwardly, as viewed in FIG. 5, over the upper part of the cuff 120 and then downwardly. The end 208 is then routed under the lowermost portion of the cuff 120 and trained over the thimble 104. The end 208 of the ground wire 182 engages the thimble 104 to complete the electrically conductive path.

From the above description of at least one preferred embodiment of the invention, improvements, changes and modifications will be perceived. Such improvements, changes and modifications are intended to be covered by the appended claims.

Having described at least one aspect of the invention, what is claimed is:

1. A filter bag structure for use in a baghouse having a tubesheet with a plurality of openings, the filter bag structure comprising:

a filter bag having a portion formed into a cuff, the filter bag having filtration media of a substantially electrically non-conductive material, the cuff of the filter bag to be positioned adjacent an opening and mounted to structure of the tubesheet;

an electrically conductive ground wire extending along a portion of the filter bag and having a portion to contact the tubesheet for electrical conductivity;

an electrically conductive anti-collapse ring extending around another portion of the filter bag; and an electrically conductive cover securing the anti-collapse ring to the filter bag and providing electrical conductivity between the ground wire and anti-collapse ring.

2. The filter bag structure of claim 1 wherein the filter bag is substantially cylindrical in shape and an axial end portion of the filter bag forms the cuff.

3. The filter bag structure of claim 1 wherein the ground wire is attached to the filter bag.

4. The filter bag structure of claim 3 wherein the ground wire is attached to the filter bag along a seam of the filter bag.

5. The filter bag structure of claim 1 wherein the ground wire and cover are made from a stainless steel mesh.

6. The filter bag structure of claim 1 wherein the anti-collapse ring is made from steel.

7. A filter bag structure for use in a baghouse having a tubesheet with a plurality of openings, the filter bag structure comprising:

a substantially cylindrical filter bag having an axial end portion formed into a cuff, the filter bag having filtration media of a substantially electrically non-conductive material, the cuff of the filter bag to be positioned adjacent an opening and mounted to structure of the tubesheet;

an electrically conductive ground wire extending along a portion of the filter bag and having a portion to contact the tubesheet;

an electrically conductive anti-collapse ring extending around another portion of the filter bag; and an electrically conductive cover securing the anti-collapse ring to the filter bag and providing electrical conductivity between the ground wire and anti-collapse ring.

8. The filter bag structure of claim 7 wherein the ground wire is attached to the filter bag.

9. The filter bag structure of claim 8 wherein the ground wire is attached to the filter bag along a longitudinally extending seam of the filter bag.

10. The filter bag structure of claim 7 wherein the ground wire and cover are made from a stainless steel mesh.

11. The filter bag structure of claim 7 wherein the anti-collapse ring is made from steel.

\* \* \* \* \*